Feb. 25, 1958     H. H. CAMPBELL     2,824,523
PRESSURE LOADED PUMP
Original Filed June 15, 1950
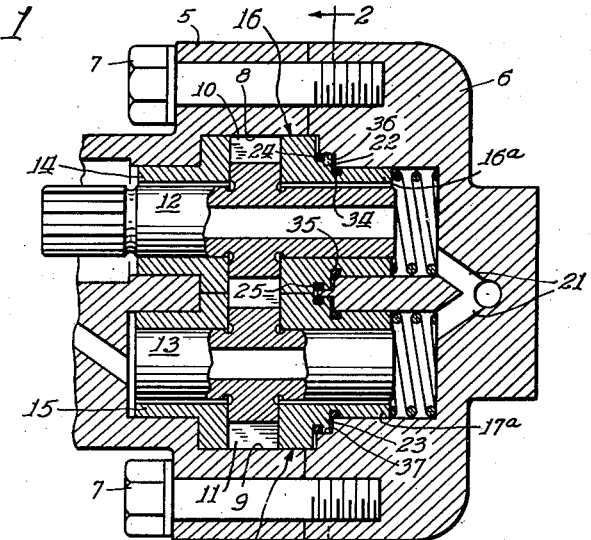
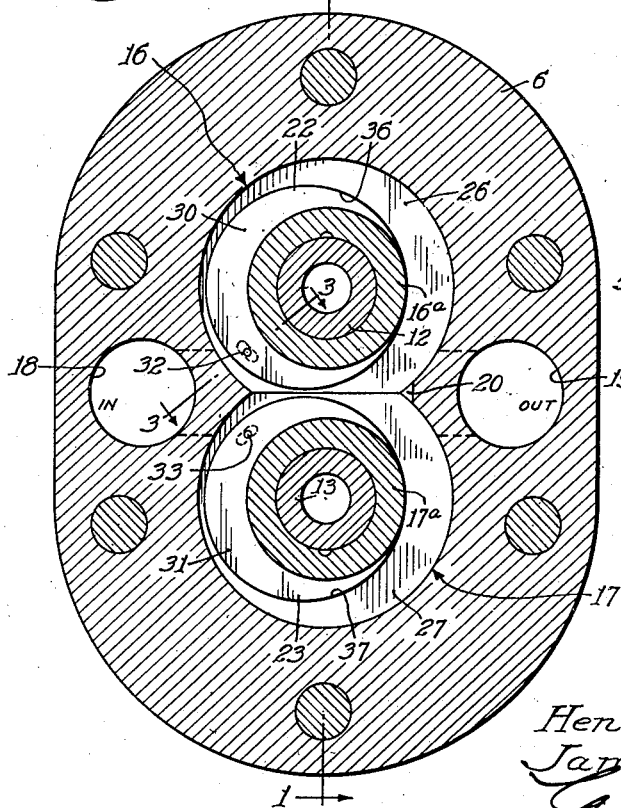
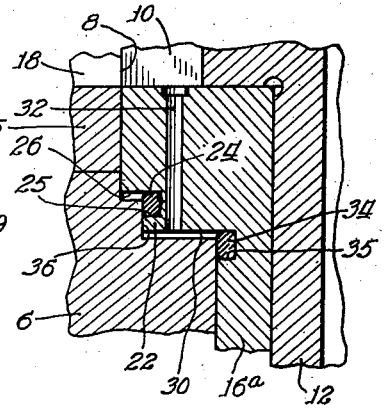
Inventor
Henry H. Campbell and
James A. Compton

United States Patent Office 2,824,523
Patented Feb. 25, 1958

2,824,523

PRESSURE LOADED PUMP

Henry H. Campbell, East Cleveland, and James A. Compton, South Euclid, Ohio, assignors to Borg-Warner Corporation, Chicago, Ill., a corporation of Illinois Continuation of application Serial No. 168,216, June 15, 1950. This application November 19, 1953, Serial No. 393,029

18 Claims. (Cl. 103—126)

This is a continuation of application Serial No. 168,216, now abandoned, of Henry H. Campbell and James A. Compton filed June 15, 1950 for "Pressure Loaded Pump."

This invention relates to a gear pump, and more particularly to a gear pump of the type employing pressure loaded bushings, such gear pumps sometimes being referred to as pressure loaded gear pumps.

In a pressure loaded gear pump of the type having one set of axially movable pressure loadable bushings, a part of the output or discharge pressure of the pump is applied to the rear or motive surfaces of the axially adjustable bushings to urge these bushings into sealing engagement with their associated gears. As disclosed in U. S. Patent No. 2,420,622 to Roth et al. by carefully selecting the relative areas of the forward surfaces of the bushings and of the motive surfaces of the bushings, it is possible to control within very close limits the actual sealing pressure provided. In practice, this requires a somewhat higher force in the direction of seal than in the direction tending to open the seal.

In the usual form of pressure loaded pump, the pressure loading motive chamber to which output pressure is supplied will be substantially uniformly subjected to output pressure. That is to say, at any point on the motive surface at the rear of the bushing the same pressure will exist. This is not true of the forward or gear side surface engaging face of the bushing. This forward face is normally subjected to a distinct pressure gradient extending from the inlet pressure in the area adjacent the pump inlet, which is the lowest pressure of the gradient, to the outlet pressure in the area adjacent the discharge side of the pump, at which area the pressure gradient is at its highest level. Accordingly, it will be evident that while the total pressure forces acting on the motive surfaces of the bushings of the pump may be made to equal the total pressure forces acting on the forward surfaces of the movable bushings, or to exceed these latter forces, the pressures acting on particular areas of the forward surfaces will not be uniform and that the portion of the bushing surface nearer the inlet will be subjected to a lesser pressure, tending to break the seal than the portion of the forward bushing surfaces nearer the outlet of the pump. This unbalanced condition tends to twist the bushing in the pump and results in uneven wear, thereby increasing the power required to turn the pump. Wear is, of course, concentrated on the inlet side of the pump.

It has been found that this unbalanced condition can to some extent be reduced by providing balancing grooves on the gear side face engaging surfaces of the pressure responsive bushings, these balancing grooves communicating at one end with the discharge side of the pump and extending coaxially of bushings toward the inlet port of the pump but terminating short thereof. The balancing grooves tend to render the pressure uniform over a larger area of the gear side face engaging surface than without the grooves. It will be evident, however, that it is not possible to extend the balancing grooves completely around the pump without providing a leakage path to the inlet side of the pump from the outside side with consequent loss of pressure. Thus, while balancing grooves are helpful, they do not result in a perfectly balanced pump.

As set forth in the earlier-filed application of Frederick C. Haberland, Serial No. 130,904 filed December 3, 1949, the unbalanced condition resulting from the pressure gradient acting across the forward surfaces of the bushings may be compensated by offsetting the pressure responsive motive surface of the bushings so that a lesser area of each motive surface is exposed on the inlet side of the pump than on the discharge side. This is accomplished by employing bushings having flanged end portions adapted to engage the pumping element side surfaces in sealing relation and by offsetting the periphery of the barrel portion in the direction of the inlet side of the pump. The resultant, generally annular motive surface area at the back of the flanged portion has a markedly less width adjacent the inlet of the pump than adjacent the outlet. Therefore, since the force exerted is a function of the pressure and the area, a proportionately greater force is exerted on the discharge side of the motive surface than on the inlet side, thus compensating for the pressure gradient across the forward surface of the bushings.

It has been found in some cases that it is desirable to operate pumps of this type at relatively high inlet pressures. Thus, for example, in some tandem pump applications the inlet pressure to the pump may not be more than a few hundred pounds per square inch less than the discharge pressure of the pump and may be as high as a thousand pounds per square inch or more. It will be apparent that in such an application, for optimum operating efficiency it is not always feasible to disregard inlet pressure, but rather that definite provision must be made not only for balancing the loading pressure to compensate for the pressure gradient due to the discharge pressure generated by the pump but also to take into account the effect on this gradient of relatively high inlet pressure.

In the application of James A. Compton, Serial No. 163,012 filed May 19, 1950, now Patent No. 2,695,566, it is disclosed how inlet pressure may be taken into account in a multiple piece bushing assembly. The present invention is directed to means for accomplishing this with a one piece bushing.

An object of the present invention is to provide a new and improved pressure loaded, intermeshing gear type pump, and more particularly a pressure loadable bushing adapted for incorporation in a pump housing, which bushing will provide a first graduated pressure responsive motive surface to which discharge pressure is applied and a second graduated pressure responsive motive surface to which inlet pressure is applied whereby the pressure gradient effective across the gear side face engaging surface of the bushing may be substantially compensated.

In accordance with one embodiment of this invention a pressure loaded type, intermeshing gear pump having one set of axially movable, pressure loadable bushings may be provided wherein each of the axially movable bushings has associated therewith sealing means whereby a first pressure loadable motive surface area is defined which is exposed only to discharge pressure and a second pressure loadable motive surface is defined which is exposed only to inlet pressure. The area exposed to discharge pressure is offset so that the greater portion thereof is adjacent the discharge side of the pump whereas the area exposed to inlet pressure is offset so that the greater portion thereof is adjacent the inlet side of the pump.

Other objects and advantages of the present invention will be apparent from the following detailed description thereof taken in conjunction with the drawings wherein:

Fig. 1 is a fragmentary, axial, sectional view of a pressure loadable, intermeshing gear type pump having a pair of axially movable, pressure loadable bushings constructed in accordance with this invention;

Fig. 2 is a transverse, sectional view taken substantially along the line 2—2 of Fig. 1; and Fig. 3 is an enlarged, detail, sectional view taken substantially along the line 3—3 of Fig. 2.

Referring now to the drawings and particularly to Fig. 1 thereof, a pump similar to that shown in the aforementioned Roth et al. patent, except for the configuration and construction of the pressure loadable bushings, is there illustrated having a sectional housing comprising a main body portion 5 and a right closure member 6. These sections are securely bolted together as by bolts 7 and cooperate to define therewithin a pair of parallel axis, intersecting bores or pumping gear chambers 8 and 9, which are arranged to receive in complementary relationship intermeshing pumping gears 10 and 11, respectively. In the embodiment illustrated, the pumping gears have integrally formed therewith hollow journal shafts 12 and 13, respectively, and the left portions of the journal shafts 12 and 13 are received in conventional flanged bushings 14 and 15 mounted in the left portions of the pumping gear chambers 8 and 9. The right portions of the gear journals 12 and 13 are received, respectively, in axially adjustable, pressure loadable flanged bushings 16 and 17 mounted in the right side of the two pumping gear chambers 8 and 9. The pressure loadable bushings 16 and 17 are specially constructed in accordance with the present invention and will be described in detail hereinafter.

In the embodiment illustrated, the upper pumping gear 10 is the driving gear and is rotated in a clockwise direction, as viewed in Fig. 2. In accordance with conventional pump design practice, the journal shaft 12 of the upper gear 10 is extended to the left, as viewed in Fig. 1, and coupled to a suitable power source (not shown) for rotating the shaft. Low pressure liquid is introduced into the pump housing at port 18 formed in the left side of the pump housing, as viewed in Fig. 2, and high pressure liquid is discharged through port 19 formed in the right side of the housing, as viewed in Fig. 2, the inlet and outlet ports communicating with the inlet and discharge areas, respectively, of the intermeshing pumping gears. The pressure loadable bushings 16 and 17 are fitted into the bores 8 and 9 with sufficient clearance to permit slight axial movement of the bushings with respect to the bores.

In the operation of a pump of this type discharge pressure generated by the intermeshing gears may be communicated from the outlet or discharge side thereof to the pressure loading areas in the back of the bushings through an axially extending passage 20 formed between the peripheries of the flanged portions of the pressure loadable bushings on the discharge side of the pump at the point of convergence of the flanged portions of the bushings. The passage 20 extends from the discharge side of the gears to the right, as viewed in Fig. 1, to the intercommunicating portions of the pressure loading areas at their point of juncture. Escape of discharge pressure rearwardly from the pressure loading surfaces is prevented by suitable sealing means to be described hereinafter. Pressure leaking past this sealing means may be vented to inlet pressure or to a zone of intermediate pressure through intercommunicating, converging passages 21 formed in the cover 6 in accordance with conventional pressure loaded pump practice as set forth in detail in the above-referenced Roth et al. patent.

It is a characteristic of a gear pump of the type herein shown that during the pumping operation thereof a pressure gradient will exist across the faces of the bushings adjacent the gears, the pressure gradient extending from a low pressure value corresponding to the inlet pressure of the pump on the inlet side thereof to a higher pressure value corresponding to the discharge pressure of the pump at the outlet side thereof. On the other hand, the pressure applied to the motive surface areas at the back of the flanged portion of the axially movable bushings is normally substantially uniform over the full extent thereof which is exposed to discharge pressure. It will be apparent, therefore, that since the gear side face pressure acting against the loading pressure in the area adjacent the discharge side of the pump exceeds the gear side face pressure acting against the loading pressure in the area adjacent the inlet side of the pump, the axially movable bushings 16 and 17 will tend to engage the gear side faces with a correspondingly greater force adjacent the inlet side. This unbalanced condition tends to result in increased wear and more particularly uneven wear, resulting ultimately in accelerated deterioration of the pump. On the other hand, the pump, as pointed out hereinbefore, may be employed as the second pump in a tandem arrangement and have, therefore, a relatively high inlet pressure supplied to the inlet port. Where this pressure is relatively high as compared with the discharge pressure of the pump, then merely offsetting the area at the back of the bushings exposed to discharge pressure or restricting this area to define an offset area in the manner disclosed in the copending application of Oliver, Serial No. 168,622 filed June 16, 1950, now Patent No. 2,756,681, may not be completely satisfactory and may even result in over-compensation, causing the bushing to engage the gear side face more strongly adjacent the discharge side of the pump. The present invention is designed to provide an arrangement wherein not only is the pressure gradient resulting from the fact that the discharge pressure exceeds the inlet pressure taken into account but, also, the effect on this normal pressure gradient of a higher than normal inlet pressure may be also taken into account.

In accordance with the present invention, a boss or axially extending and radially outwardly projecting annular shoulder of circular configuration is formed on the back of the flanged portion of each pressure loaded bushing, the boss being designated 22 on bushing 16 and 23 on bushing 17. These boss portions are offset with respect to the axis of the bushing, being located nearer the left side of the bushing than the right, as viewed in Fig. 2, that is, nearer the inlet side of the pump gears, whereby a larger portion of the area at the back of the flanged portion of the bushing adjacent the discharge side thereof is exposed to discharge pressure applied through passage 20 than is exposed to discharge pressure adjacent the inlet side thereof. A seal ring 24, received in an annular groove 25 formed about the periphery of each boss, is provided to prevent escape of pressure rearwardly from the discharge pressure loading area, that is, the area at the back of the flanged portion of each bushing lying between the periphery of the boss and the outer perimeter of the flanged portion of the bushing. These annular, offset pressure loading surfaces which are designated 26 and 27, respectively, on the bushings 16 and 17 function in a manner similar to that described in conjunction with the arrangement shown in the aforementioned Haberland application to compensate for the pressure gradient normally encountered in the operation of a gear pump.

The present invention, however, employs a second area which is oppositely offset with respect to the axis of each bushing from the direction of offset of the above-described primary pressure loading motive surface and which enables the pump to compensate automatically for higher than normal inlet pressure distorting the normal pressure gradient. The barrel or tubular bearing portion or extension designated 16–a and 17–a, respectively, of each bushing is located concentrically with respect to the axis of the bushing and extends to the right from the boss or shoulder portion thereof, as shown in Fig. 1. The pressure loaded bushings each therefore comprise an inner tubular bearing bore portion and an outer portion comprising a flange adjacent the gear, a shoulder 22 and a tubular extension 16a or 17a. The offset, annular areas designated 30 and 31 of each of the bushings lying at the back of the offset boss portions 22 and 23, that is, the areas comprising the right side faces thereof as viewed in Fig. 1 is vented to inlet pressure through axially extending passages 32 and 33, respectively, formed in each of the bushings and extending from the rear surface of the boss on each bushing to the forward or gear side face engaging surface. The radial and angular location of each of these passages is selected so that the gear side face engaging end thereof is in communication with the inlet side of the pump through the gear teeth pockets. In this manner, the areas at the back of the bosses are exposed to inlet pressure and since these areas are offset in the direction of the inlet side, that is, oppositely disposed with respect to the area exposed to discharge pressure, inlet pressure applied thereto is effective in compensating the change in the normal pressure gradient across the gear side face engaging surfaces of the bushings resulting from high inlet pressure. Escape of pressure rearwardly from the inlet pressure responsive surface of each bushing is prevented by a second O-ring seal 34 positioned in an annular groove 35 formed about the periphery of the barrel portion of each bushing.

In order to accommodate the specially constructed bushings of this invention the cover 6 must, of course, be modified somewhat over the cover disclosed in conjunction with the aforementioned Roth et al. patent. Thus, the bore 8 is provided with a first recess 36 which is offset in the direction of the inlet side thereof complementarily to the boss 22 formed on the bushing 16, and the chamber 9 is similarly provided with a recess 37 which is offset complementarily to the boss 23 formed on the bushing 17. The right portion of each bore is conventionally formed to receive the barrel portion end of each bushing and is, of course, concentrically located with respect to the axis of the pump gear journal shafts.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

While but one embodiment of this invention has been shown and described herein, it will be understood that many changes and modifications may be made therein without departing from the spirit or scope of the invention.

We claim:

1. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, an axially apertured end plate of unitary construction received in said pump chamber and adapted to engage the side surface of said rotatable member in pumping seal relation, a first, continuous annular surface area on said end plate facing away from said rotatable member and normally spaced from the adjacent end wall of said housing, a second surface area on said end plate engageable with the adjacent side face of said rotatable member to provide a pumping seal therewith, said second surface area being subject to a pressure gradient extending from a minimum value adjacent the inlet of the pump chamber to a maximum value adjacent the outlet of the pump chamber, a third, continuous annular surface area on said end plate facing away from said rotatable member and normally spaced from the adjacent end wall of said housing, said first and third surface areas being eccentrically disposed with respect to said second surface area and lying in spaced planes parallel with respect to each other, passage defining means effective to direct pressure liquid generated by said rotatable member to the first surface area of said end plate for urging the end plate in the direction of the adjacent side surface of said rotatable member, and passage defining means effective to direct pressure liquid admitted to said pump at said inlet to the third surface area of said end plate for urging the end plate in the direction of the side surface of said rotatable member in sealing relation.

2. In a pressure generating pump of the type including a housing containing intermeshing gears and having an inlet leading to and an outlet leading from said housing, axially movable bushings and fixed bushings, each of said bushings having a forward surface engageable with the side face of said gears, said forward surface being subject to a pressure gradient existing between the fluid pressure adjacent the inlet and fluid pressure adjacent the outlet, said axially movable bushings having flanged portions and barrel portions, said flanged portions having a first rear surface area subject to discharge pressure for maintaining sealing engagement with the gear side face during operation of the pump, said flanged portion having a second surface area subject to inlet pressure, said first and second surface areas being eccentrically disposed with respect to said forward surface area and lying in spaced planes substantially parallel to each other, a first sealing means operatively disposed between said first surface area and second surface area to prevent pressure communication therebetween, and a second sealing means operatively disposed between said second surface area and the remainder of said barrel portion to substantially prevent pressure communication along the barrel portion of said bushing.

3. In a pressure generating pump of the type including a housing containing a rotatable pumping member and having an inlet leading to and an outlet leading from said housing, axially movable bushing means having a forward surface engageable with a side face of said rotatable pumping member, said forward surface being subject to a pressure gradient existing between the fluid pressure adjacent the inlet and the fluid pressure adjacent the outlet, said axially movable bushing means having first rear surface areas subject to discharge pressure for maintaining sealing engagement with the rotatable pumping member side face during operation of the pump, said axially movable bushing means having a second surface area subject to inlet pressure, said first and second areas being eccentrically disposed with respect to the forward surface area and in spaced planes with respect to each other, a first sealing means operatively disposed between said first surface area and said second surface area to prevent communication therebetween, and a second sealing means operatively disposed between said second surface area and the remainder of said bushing means to substantially prevent pressure communication between said second surface area and the remainder of the bushing means.

4. In a pump, a housing having an inlet and an outlet and providing a pumping cavity, and backing plate means for said cavity having a pressure-receiving back surface with an outer periphery concentric with respect to the axis of the backing plate means forming together with means including a portion of said housing a pressure control chamber in communication with pump-generated pressure, said backing plate means having a shoulder extending axially from said back surface and being offset radially to form an inner periphery on said back surface eccentric with respect to said axis to reduce the effective area of said back surface towards the inlet side of the pump for balancing unequal pressure forces in the cavity, said backing plate means having a reduced tubular extension extending axially from said shoulder and being concentric with respect to said axis.

5. In a pressure-loaded pump of the type having rotary gear-displacement means, the improvement of a bushing having inner and outer portions, said inner portion comprising a generally cylindrical bearing surface for journalling the gear-displacement means, said outer portion comprising a generally annular flange having an outer periphery concentric with the axis of said bushing at one end of said bushing and said flange having a first face to sealingly engage the adjoining side face of the rotary gear-displacement means and having a second face forming a pressure-loading surface, a tubular bearing extension at the other end of said bushing and concentric with the axis thereof, and an annular shoulder extending axially from said flange and projecting radially outwardly of said extension thereby forming an inner periphery on said second face which is eccentric with respect to the axis of said bushing to reduce the effective face area of said pressure-loaded surface toward one side of the bushing for balancing unequal pressure loads acting on said first face.

6. As an article of manufacture adapted for use in a pressure-loaded gear pump, an improved slidable bushing comprising a metal bushing having inner and outer portions, said inner portion comprising a tubular bearing bore providing a cylindrical bearing surface, said outer portion comprising three axially spaced parts including a flange, an annular shoulder extending axially from said flange and a reduced tubular extension extending axially from said shoulder concentric to the axis of the bushing, said flange and said extension being concentric with respect to one another and to the axis of said bushing, said shoulder being eccentrically offset relative to the axis of the bushing and forming an inner periphery for the back face of said flange to progressively reduce the effective face area on the back face of said flange toward one side thereof, said back face of said flange constituting a surface adapted to form a pressure-responsive wall in a pressure control chamber, whereby a non-uniform axial thrust may be delivered to the slidable bushing.

7. In a high pressure pump, a housing having a pumping chamber, rotary fluid-displacement means in said chamber and shaft elements to journal same, and a slidable bushing on one side of said rotary fluid-displacement means having a cylindrical inner part forming a bearing surface adapted to be slidable on said shaft elements and arranged to rotatably journal said rotary fluid-displacement means, the outer part of said bushing including a flange on one end of said bushing having an outer periphery concentrically disposed with respect to the axis of said bushing, said flange having one face to sealingly engage said rotary fluid-displacement means, the other face of said flange constituting a pressure-responsive surface and together with said housing forming a pressure control chamber in back of said flange and a shoulder on the peripheral surface of said inner part extending axially from said flange and offset radially to form an inner periphery on said pressure-responsive surface which is offset to decrease the effective area of said pressure-responsive surface toward one side of said flange, said housing being correspondingly recessed to receive said shoulder, means to supply pressured fluid to said chamber to act on the effective area of said surface, a non-uniform thrust being delivered to said bushing to load said bushing against unequal forces acting on said one face, and a reduced tubular extension extending axially from said shoulder and being concentrically disposed with respect to the axis of said bushing, said housing having a recess formed therein receiving said tubular extension in bearing support relation.

8. In a pressure-loaded pump having rotary fluid-displacement means therein, a slidable bushing having a bore formed therein providing a bearing surface to rotatably journal a shaft portion of the fluid-displacement means, a flange on one end of said bushing having an outer periphery generally concentric to the axis of said bushing, one face of said flange adapted to engage said rotary fluid-displacement means, the other face adapted to form a pressure-responsive surface, a reduced tubular extension concentric with the axis of said bushing on the other end of said bushing providing bearing support for the displacement means, and an annular shoulder extending axially from said flange and projecting outwardly from said tubular extension to form the inner periphery of said pressure-responsive surface, said shoulder being offset radially to the axis of said bushing to decrease the effective area of said pressure-responsive surface towards one side of said flange, said tubular extension extending axially from said shoulder, and means to pressure-load said surface, whereby a non-uniform axial pressure thrust is delivered to said bushing to balance unequal forces on said one face.

9. A pump comprising a housing having a pumping chamber therein with an inlet and an outlet, rotary meshing gears rotatable in said pumping chamber to displace fluid from said inlet to said outlet, a slidable bushing for each gear, each of said bushings comprising a tubular extension at one end concentric with the axis of said bushing forming a bearing journal for one of said gears, a flange at the other end having a gear-engaging face on the front side of said flange and a pressure-responsive face on the back side of said flange with an outer periphery concentric to the axis of said bushing, said flange together with said housing forming a pressure control chamber in back of said pressure-responsive face, means to provide fluid outlet pressure to said chamber, thereby to axially load said bushing towards said gear, an annular shoulder projecting axially from said flange and projecting radially outwardly of said tubular extension eccentric to said axis adjacent said flange to form the inner peripheral edge of said pressure-responsive face on said flange, said tubular extension extending axially from said shoulder, said housing having a recess formed therein to receive said shoulder, and an annular sealing member engaging said housing and being located in said recess engaged against the peripheral surface of said shoulder, thereby to prevent leakage from said chamber along the length of said bushing.

10. In a pump, a housing having an inlet, an outlet and a pumping cavity, means defining an axially adjustable bushing having a radially extending flange at one end formed with a pressure-responsive surface for effecting a liquid seal of the cavity, said bushing being further formed with a reduced axial tubular extension concentric with the axis of said bushing at the other end received in a corresponding reduced bore in said housing, a shoulder extending radially outwardly of said extension and projecting axially from said flange, said shoulder being offset eccentrically with respect to the axis of said bushing and forming the inner peripheral edge of said pressure-responsive surface to progressively reduce the face area of said pressure-responsive surface towards one side thereof, said housing being successively counterbored concentrically to receive said flange, eccentrically to receive said shoulder and concentrically to receive said tubular extension, whereby critical clearances are maintained at adjoining parts in concentric relation, means for directing pressure liquid to said reduced face area of said pressure-responsive surface for balancing unequal pressure forces in said cavity, and a sealing member positioned between the peripheral surface of said shoulder and said housing, whereby leakage of said pressure liquid is prevented and said sealing member affords a wide range of manufacturing tolerance at the eccentrically-related portions.

11. A fluid pump of the type including a housing having an inlet and an outlet port formed therein, a rotatable pumping member journalled in said housing for transferring fluid from said inlet to said outlet, axially movable end plate means adapted to engage said pumping member in sealing relation and movable independently of said rotatable pumping member, a continuous generally annular motive surface on said end plate means adapted in response to application of pressure thereto to urge said end plate means toward said rotatable member to establish said sealing relation, a male portion on said end plate means between said housing and said end plate means projecting axially from said motive surface prescribing a generally circular inner periphery for said motive surface eccentrically disposed with respect to the axis of said end plate means, said housing having a correspondingly offset recess formed therein for receiving said male portion, conduit-defining means for continuously communicating pressure generated by said pump to said motive surface, said motive surface having a generally circular outer periphery concentrically disposed with respect to the axis of said end plate means, said inner periphery having its center offset towards said inlet port, and a reduced tubular extension extending axially from said male portion having its periphery concentrically disposed with respect to said axis of said end plate means.

12. In a pressure-loaded pump of the type comprising a housing having an inlet and an outlet formed therein, a pair of intermeshing pumping gears rotatably journalled in said housing, an axially movable pressure-loaded bushing associated with each of said gears and having a forward sealing surface thereon at one end adapted to engage the associated gear side face in sealing relation, each bushing being axially movable with respect to its associated pumping gear, a motive surface on each bushing oppositely disposed with respect to said sealing surface, a reduced axially projecting tubular bearing portion at the other end of said bushing concentric with the axis of said bushing, conduit-defining means for continuously communicating pressure generated by said pump to said motive surfaces to urge said bushing forward surfaces into said sealing relation, and shoulder means integral with each said bushing projecting axially from said motive surface but of shorter length than the bearing portion and extending radially from said reduced tubular bearing portion eccentric to said axis and cooperating with said housing to form the inner periphery of said motive surface thereby restricting the area of said motive surface exposed to pressure generated by said pump, whereby the area lying adjacent the outlet of the pump is greater than the area exposed adjacent the inlet side of the pump.

13. In a fluid pump of the type including a housing having an inlet and an outlet port formed therein, a rotatable pumping member in said housing for transferring fluid from said inlet to said outlet, axially movable end plate means having a sealing surface at one end engageable with one side of said pumping member in sealing relation, said end plate being axially movable with respect to said pumping member, a motive surface on said end plate oppositely located with respect to said gear-engaging surface and adapted in response to application of loading pressure thereto to urge said end plate toward said rotatable member to establish said sealing relation, an axially projecting tubular bearing portion on the other end of said bushing concentric with the axis of said end plate means, conduit-defining means for continuously communicating loading pressure generated by said pump to said motive surface, said motive surface and said bearing part being generally annular and each having a substantially circular outer periphery concentrically disposed with respect to the axis of rotation of the pumping member, and a shoulder on said end plate axially projecting from said motive surface and of shorter axial length than said tubular bearing portion for prescribing the inner periphery of said motive surface, said shoulder being eccentrically disposed with respect to said axis and having its center offset toward said inlet port whereby said motive surface has a substantially lesser radial dimension adjacent said inlet port than adjacent said discharge port so that upon application of a uniform fluid pressure per unit area to said motive surface a graduated sealing force is provided having a minimum value adjacent said inlet and a maximum value adjacent said outlet.

14. In a pump, a housing having an inlet and an outlet and providing a pumping cavity, a movable bushing having a flange at one end, a front face on said flange forming a sealing surface for the cavity and a back face on said flange forming a pressure-receiving back surface having an outer periphery concentric with the bushing axis, a shoulder extending axially from said flange offset radially to form an inner periphery on said back surface eccentric to said bushing axis to reduce the effective area of said back surface towards the inlet side of the pump, and a reduced tubular extension on said bushing extending axially from said shoulder and being concentric to the bushing axis, and means forming a pressure control chamber behind said back surface in communication with pump-generated pressure to pressure-load the bushing.

15. In a pump, a housing having an inlet and an outlet and providing a pumping cavity, a movable bushing having a flange at one end, a front face on said flange forming a sealing surface for the cavity and a back face on said flange forming a pressure-receiving back surface having an outer periphery concentric with the bushing axis, a shoulder extending axially from said flange offset radially to form an inner periphery on said back surface eccentric to said bushing axis to reduce the effective area of said back surface towards the inlet side of the pump, and a reduced tubular extension on said bushing extending axially from said shoulder and being concentric to the bushing axis, and means forming a pressure control chamber behind said back surface in communication with pump-generated pressure to pressure-load the bushing, said housing having a bore and a counterbore both disposed concentrically with respect to one another to receive said tubular extension and said flange of said bushing, said housing having a recess formed therein to receive said shoulder, and a sealing member in engagement with said recess and surrounding said shoulder to prevent leakage from said pressure-control chamber.

16. A fluid pump comprising a housing having a pump chamber formed therein, means including a rotatable member received in said pump chamber effective to force fluid from said inlet out of said housing through said outlet, an axially apertured bushing defining means of unitary construction received in said pump chamber and adapted to engage the side surface of said rotatable pumping member in pumping seal relation, a first continuous annular surface area on said bushing defining means facing away from said rotatable pumping member and normally spaced from an adjacent end wall of said housing, a second surface area on said bushing defining means engageable with the adjacent side surface of said rotatable member to provide a pumping seal therewith, said second surface area being subject to pressure gradient extending from a minimum value adjacent the inlet of the pump chamber to a maximum value adjacent the outlet of the pump chamber, a third, continuous annular surface area on said bushing defining means spaced from an adjacent end wall of said housing, and sealing means located between said first surface area and said third surface area to prevent communication of pressure therebetween, said sealing means further cooperating with a means including a portion of said housing to define said first and third surface areas eccentric with respect to said second surface area, means communicating outlet pressure to said first surface area, and means communicating inlet pressure to said third surface area, said last two-named means being effective to urge said bushing defining means in the direction of the adjacent side surface of said rotatable member, said sealing means comprising O-ring seals.

17. In a high pressure pump including a body having a pumping cavity with an inlet and an outlet, and a rotatable pumping member; a bearing means in said cavity having end plate portions and a tubular bearing portion; said end plate portions being eccentrically displaced with respect to said tubular bearing portion; one of said end plate portions having its greater area in the region of the pump outlet and a second end plate portion having its greater area in the region of the pump inlet; sealing means disposed adjacent said end plate portions and encircling the axis of said pumping member; said bearing means, said sealing means and said body arranged to define a first and a second chamber behind said first and second end plate portions respectively; means providing a passage in communication with the pump discharge and said first chamber; and means providing a passage in communication with the pump inlet and said second chamber; whereby pressure forces in the pump cavity tending to cock the bearing means will be balanced by the pressure forces in said chambers, said sealing means comprising O-ring seals.

18. In a high pressure pump including a body having a pumping cavity with an inlet and an outlet, and a rotatable pumping member; a bearing means in said cavity having end plate portions and a tubular bearing portion; said end plate portions being eccentrically displaced with respect to said tubular bearing portion; one of said end plate portions having its greater area in the region of the pump outlet and a second end plate portion having its greater area in the region of the pump inlet; sealing means disposed adjacent said end plate portions and encircling the axis of said pumping member; said bearing means, said sealing means and said body arranged to define a first and a second chamber behind said first and second end plate portions respectively; means providing a passage in communication with the pump discharge and said first chamber; and means providing a passage in communication with the pump inlet and said second chamber; whereby pressure forces in the pump cavity tending to cock the bearing means will be balanced by the pressure forces in said chambers, said sealing means comprising a first sealing means and a second sealing means, one of said first and second sealing means having its center offset with respect to the axis of said pumping member.

References Cited in the file of this patent
UNITED STATES PATENTS

| | | |
|---|---|---|
| 1,909,418 | Norwood | May 16, 1933 |
| 2,044,873 | Beust | June 23, 1936 |
| 2,312,655 | Lauck | Mar. 2, 1943 |
| 2,420,622 | Roth et al. | May 13, 1947 |
| 2,444,165 | Lauck | June 29, 1948 |
| 2,472,031 | Wichorek | May 31, 1949 |
| 2,487,732 | Schanzlin | Nov. 8, 1949 |

FOREIGN PATENTS

| | | |
|---|---|---|
| 318,871 | Great Britain | Sept. 11, 1929 |
| 551,680 | France | Jan. 11, 1923 |